United States Patent Office 3,595,808
Patented July 27, 1971

3,595,808
CALCIUM NICKEL PHOSPHATE CATALYSTS AND METHOD OF PREPARING SAME
Hugh C. Bertsch, St. Louis, Mo., and John A. Dreibelbis, Wattsburg, Pa., assignors to Mallinckrodt Chemical Works, St. Louis, Mo.
No Drawing. Filed Dec. 13, 1968, Ser. No. 783,774
Int. Cl. B01j *11/82*
U.S. Cl. 252—437
5 Claims

ABSTRACT OF THE DISCLOSURE

Dehydrogenation catalysts of improved selectivity are prepared by precipitating calcium nickel phosphate at a pH above 7 in the presence of a small amount of manganese, for example 0.1 mole percent based on the combined calcium plus nickel. Advantageously, the precipitation may be carried out at a constant pH. The resulting calcium nickel phosphates are essentially in the form of β-tricalcium phosphate and are substantially free from undesirable hydroxyapatite.

FIELD OF THE INVENTION

The present invention relates to catalysts, and more particularly to calcium nickel phosphate catalysts for the dehydrogenation of olefins.

SUMMARY OF THE PRIOR ART

Calcium nickel phosphate is a well known catalyst for the dehydrogenation of olefinic compounds, particularly for the dehydrogenation of n-butene to produce 1,3-butadiene.

Catalytically active calcium nickel phosphate as previously known and used consists essentially of a combination of calcium orthophosphate and hydroxyapatite in which a portion of the calcium ions are replaced by nickel ions. The ratio of nickel to calcium is usually 1 atom of nickel for each 6 to 12 atoms of calcium.

As precipitated, the calcium nickel phosphates known heretofore are catalytically inactive. For use the calcium nickel phosphate is first combined with a lubricant such as graphite and a catalyst promoter such as chromium oxide, and formed into pellets. The pellets must then be roasted in an atmosphere of air and steam to burn off the graphite and activate the calcium nickel phosphate. Various theories have been proposed to explain this "activation," none being wholly satisfactory. It has been generally agreed, however, that it involves some crystalline transformation of the calcium phosphate, with at least partial conversion of the hydroxyapatite into calcium orthophosphate.

Various methods have been proposed and used for preparing the "raw," i.e., unroasted, calcium nickel phosphate. For example, an aqueous solution of calcium nickel salts may be added to an aqueous solution of ammonium phosphate, or conversely, the ammonium phosphate solution may be added to the solution of calcium and nickel salts. Alternatively, an aqueous solution of calcium and nickel salts in phosphoric acid may be added to an aqueous solution of ammonia. In still another method, an aqueous solution of nickel in phosphoric acid is added to an aqueous suspension of calcium hydroxide. There is also a continuous process in which an aqueous solution of alkaline orthophosphate and an aqueous solution of calcium and nickel salts are simultaneously passed into a reaction zone with continuous agitation of the reaction mixture and withdrawal of a portion of the precipitated calcium nickel phosphate. Some importance has also been attached to the pH of the precipitation medium. In some methods, the precipitation is begun in an acid medium with the pH gradually increasing as the precipitation progresses until the medium is definitely alkaline at the end. In other methods, the "average pH" is controlled within fairly narrow limits, e.g., 7.7–8.3, although the actual pH at any given time may be far outside these limits. And in still another method the medium is alkaline (pH 7–11) throughout the precipitation.

Regardless of which method is employed, the resulting calcium nickel phosphate contains substantial amounts of hydroxyapatite. While it has been recognized that an excessive amount of hydroxyapatite shorten the useful life of the catalyst, it was also believed that some hydroxyapatite was probably necessary for the catalyst to be active.

In addition to catalyzing the desired dehydrogenation reaction, these substances also to some degree catalyze other side-reactions such as cracking and carbonization. Catalytic activity is therefore measured by conversion rate, i.e., the mole percent of the olefin consumed, and the selectivity, i.e., the proportion of the consumed olefin which is converted to the desired diene. These rates are dependent in part upon the catalyst and in part upon other operating conditions which are not germane to the present invention. Under optimum conditions, conversion rates of 40% or more with selectivity of 90% are attainable.

After the olefinic feed material has been passed through the catalyst for a time it begins to lose activity because of the accumulation of carbon and perhaps other changes. The feed material must therefore be replaced periodically with air so as to burn off the carbon and regenerate the catalyst. The "life" of the catalyst is therefore measured, not in time, but in pounds of diene that can be produced from one pound of catalyst.

It is apparent that a catalyst which promotes dehydrogenation of the monoolefin without also promoting thermal decomposition will increase both the efficiency of the desired catalytic process and the life of the catalyst and so would be of great economic importance.

SUMMARY OF THE INVENTION

Among the objects of the present invention may be noted the provision of calcium nickel phosphate catalysts with improved selectivity for catalyzing the dehydrogenation of olefins; the provision of catalysts which are substantially free from substances which promote wildness; the provision of such catalysts of substantially homogeneous composition and structure; and the provision of methods for making catalysts of the character described. Other objects and features will be in part apparent and in part pointed out hereinafter.

The present invention is thus directed to calcium nickel phosphate catalysts for the dehydrogenation of monoolefins to diolefins which comprise nickel ions incorporated in the lattice structure of β-calcium phosphate in the ratio of 1 atom of nickel for each 6 to 12 atoms of calcium, the calcium nickel phosphate being substantially free from extraneous nickel and hydroxyapatite. The invention is also directed to the novel method of precipitating calcium nickel phosphate in this form.

It has now been discovered that the active catalyst for the dehydrogenation of monoolefins to diolefins is β-calcium phosphate having incorporated in its crystal lattice nickel ions in approximately the ratio of 1 atom of nickel for each 6 to 12 atoms of calcium. β-Calcium phosphate itself is catalytically inert unless activated with nickel. It has also been found that hydroxyapatite does not contribute to the desired catalytic effect, but instead contributes to wildness, that is it catalyzes the undesired side reactions such as cracking and carbonization. Any extraneous nickel, i.e., nickel which is not incorporated in the β-calcium phosphate crystal lattice, also promotes cracking of the monoolefin feed material and contributes to catalytic wildness rather than the desired catalytic effect.

It has further been discovered that calcium nickel phosphate precipitated in the presence of a small amount of manganese, for example, 0.01 to 10.0 mole percent based upon the combined calcium plus nickel, is substantially free from hydroxyapatite. This effect is independent of the method by which the calcium nickel phosphate is precipitated.

In a preferred embodiment of the invention, the precipitation of the calcium nickel phosphate is carried out at a constant pH above pH 7.

The calcium nickel phosphate of the present invention, when treated and used in the same manner as prior calcium nickel phosphates, is an effective catalyst for the dehydrogenation of monoolefins to diolefins with significant improvement in the selectivity of the catalytic effect. It is to be understood that the efficiency of the conversion of monoolefins to diolefins and the yield of diolefin are both subject to factors other than the composition and structure of the catalyst, such as, for example, temperature and the rate at which the feed material is passed through the bed of catalyst; but under equivalent conditions, the efficiency of calcium nickel phosphate prepared according to the present invention is superior to calcium nickel phosphate prepared by the methods previously known to the art as a catalyst for the dehydrogenation of monoolefins.

Example 1

The following reactant solutions were first prepared:

Solution A: | G.
--- | ---
$CaCl_2 \cdot 2H_2O$ | 510
$Ni(NO_3)_2 \cdot 6H_2O$ | 147
$MnSO_4 \cdot H_2O$ | 3
80% $H_3PO_4$ | 320
$H_2O$ to make 5100 g. |

Solution B: |
--- | ---
28% $NH_4OH$ | 600
$H_2O$ to make 5200 g. |

These solutions were added simultaneously to a reaction vessel provided with good agitation at rates such that the pH was maintained between 8.0 to 8.1. When precipitation was complete, the slurry was filtered and the solids were washed substantially free from impurities with water. The filter cake was then dried, granulated, blended with 2% $Cr_2O_3$ and 2% graphite, and pressed into 3/16" x 3/16" pellets.

Example 2

The procedure was exactly as described in Example 1 except that the $MnSO_4 \cdot H_2O$ was omitted from Solution A.

Example 3

To a slurry containing 292 g. $Ca(OH)_2$ and 1.3 g. $MnSO_4 \cdot H_2O$ in 2200 ml. water was added a solution containing 34 g. nickel oxide (NiO) and 358 g. of $H_3PO_4$ in 200 g. of water at a rate such that the pH was maintained above 7. When the addition was complete the mixture was allowed to stand for one hour and then filtered and washed. The washed cake was dried, granulated, mixed with 3% $Cr_2O_3$ and 2% graphite, and pressed into 3/16" x 3/16" pellets.

Example 4

The method described in Example 3 was repeated except that the $MnSO_4 \cdot H_2O$ was omitted from the calcium hydroxide slurry.

Example 5

The catalysts whose preparation was described in Examples 1–4 were tested for hydroxyapatite by infrared analysis. The results were as follows:

Catalyst: | Hydroxyapatite
--- | ---
Example 1 | None detected.
Example 2 | 20%.
Example 3 | None detected.
Example 4 | ~100%.

The percent conversion and percent selectivity were also determined using these catalysts under identical conditions in a standardized process for the conversion of n-butene to 1,3-butadiene. For this purpose the precipitated catalysts were combined with chromium oxide and graphite and formed into pellets which were then roasted in the conventional manner.

| Catalyst | Percent Conversion | Selectivity |
| --- | --- | --- |
| Example 1 | 24 | 90 |
| Example 2 | ~100 | 0–5 |
| Example 3 | 38 | 89 |
| Example 4 | ~100 | 0–5 |

Thus good conversion rates were obtained with 90% selectivity of the n-butene to 1,3-butadiene. By optimizing the reaction conditions even higher conversion rates are possible without significantly reducing selectivity. Conversely the catalysts precipitated in the absence of manganese were almost completely "wild," with practically 100% disappearance of n-butene and less than 5% conversion to 1,3-butadiene.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. As a catalyst for the dehydrogenation of monoolefins to diolefins, a calcium nickel phosphate comprising nickel ions incorporated in the lattice structure of β-calcium phosphate in the ratio of 1 atom of nickel for each 6 to 12 atoms of calcium, the said calcium nickel phosphate being substantially free from extraneous nickel and hydroxyapatite.

2. The method of precipitating calcium nickel phosphate in the form of β-calcium phosphate substantially free from hydroxyapatite which comprises precipitating a calcium nickel phosphate, whose empirical composition corresponds to that of an orthophosphate of calcium and nickel in the ratio of 1 atom of nickel for each 6 to 12 atoms of calcium, in the presence of a small amount of manganese ions.

3. The method according to claim 2 in which the precipitation of calcium nickel phosphate is carried out at a constant pH above a pH of 7.

4. The method according to claim 3 in which the constant pH is not less than 7.5 nor more than 8.5.

5. The method according to claim 2 in which the amount of manganese is between approximately 0.01 and 10.0 mole percent based upon the combined calcium plus nickel.

References Cited

FOREIGN PATENTS 818,584   7/1969   Canada _____ 252—437

PATRICK P. GARVIN, Primary Examiner

U.S. Cl. X.R.

23—109; 260—680